US011757992B2

(12) United States Patent
Huertas et al.

(10) Patent No.: US 11,757,992 B2
(45) Date of Patent: Sep. 12, 2023

(54) SYNCHRONIZATION OF MULTIMEDIA CONTENT PRESENTATION ACROSS MULTIPLE DEVICES IN A WATCH PARTY

(71) Applicant: Roku, Inc., San Jose, CA (US)

(72) Inventors: Timothy Raul Huertas, San Jose, CA (US); Viktor Sergiienko, San Jose, CA (US); Jeffrey Paul Anderson, Cottonwood Heights, UT (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 17/520,431

(22) Filed: Nov. 5, 2021

(65) Prior Publication Data
US 2023/0147705 A1 May 11, 2023

(51) Int. Cl.
*H04L 67/1095* (2022.01)
*H04L 69/08* (2022.01)

(52) U.S. Cl.
CPC .......... *H04L 67/1095* (2013.01); *H04L 69/08* (2013.01)

(58) Field of Classification Search
CPC .............................. H04L 67/1095; H04L 69/08
See application file for complete search history.

(56) References Cited

U.S. PATENT DOCUMENTS

| | | | | |
|---|---|---|---|---|
| 8,739,234 | B1* | 5/2014 | Cheung | H04L 65/00 725/35 |
| 2009/0125571 | A1* | 5/2009 | Kiilerich | G06F 16/273 713/400 |
| 2009/0300691 | A1* | 12/2009 | Fletcher | H04N 21/4755 725/90 |
| 2015/0373065 | A1* | 12/2015 | Holmquist | H04L 65/1069 715/753 |
| 2018/0234496 | A1* | 8/2018 | Ratias | A63F 13/60 |
| 2019/0349619 | A1* | 11/2019 | Hou | H04N 21/2407 |
| 2021/0044845 | A1* | 2/2021 | Bertolami | H04N 21/44004 |
| 2021/0266621 | A1* | 8/2021 | Marten | H04L 65/762 |
| 2022/0070524 | A1* | 3/2022 | Iyer | H04N 21/2393 |

\* cited by examiner

*Primary Examiner* — Jeong S Park
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for synchronizing the simultaneous presentation of multimedia content across multiple devices. An example embodiment operates by generating a multimedia content synchronization request configured to instruct a second media device to synchronize a presentation of multimedia content on the second media device with a first media device. The multimedia content synchronization request can include, for example, a deep link indicative of a channel of the multimedia content, a position of the multimedia content, and a state of the multimedia content to start the presentation of the multimedia content. Subsequently, the example embodiment operates by transmitting the multimedia content synchronization request to the second media device.

20 Claims, 8 Drawing Sheets

US 11,757,992 B2

SYNCHRONIZATION OF MULTIMEDIA CONTENT PRESENTATION ACROSS MULTIPLE DEVICES IN A WATCH PARTY

BACKGROUND

Field

This disclosure is generally directed to presenting multimedia content, and more particularly to synchronizing the simultaneous presentation of multimedia content across multiple devices.

Background

Content, such as a movie or television (TV) show, is typically displayed on a TV or other display screen for watching by users. Accordingly, a user's experience of the content is typically confided to the TV. Typically, users who desire to watch the content with someone who is not sitting in front of the same TV must manually synchronize the content with the other person using a phone call, text message, or third-party application. As a result, synchronizing the simultaneous presentation of the same content across multiple, geographically-dispersed devices can be technologically challenging, especially when those devices do not share the same subscriptions. Accordingly, to date, efforts to extend a user's experience to include watching content with remotely-located relatives and friends have been limited.

SUMMARY

Provided herein are system, apparatus, article of manufacture, method and/or computer program product embodiments, and/or combinations and sub-combinations thereof, for synchronizing the simultaneous presentation of multimedia content (e.g., video and audio) across multiple devices, including, but not limited to, allowing for users to interact with one another while they watch synchronized content.

An example embodiment is directed to a computer-implemented method for synchronizing a simultaneous presentation of multimedia content across multiple media devices. The computer-implemented method operates by generating, by a multimedia content synchronization application executing on a first media device, a multimedia content synchronization request configured to instruct a second media device to synchronize a presentation of multimedia content on the second media device with the first media device. The multimedia content synchronization request can include a deep link indicative of a channel of the multimedia content, a position of the multimedia content, and a state of the multimedia content to start the presentation of the multimedia content. Subsequently, the computer-implemented method operates by transmitting the multimedia content synchronization request to the second media device.

An example embodiment is directed to a system that includes a memory and at least one processor coupled to the memory and configured to perform operations for synchronizing a simultaneous presentation of multimedia content across multiple media devices. The operations can include generating a multimedia content synchronization request configured to instruct a second media device to synchronize a presentation of multimedia content on the second media device with a first media device. The multimedia content synchronization request can include a deep link indicative of a channel of the multimedia content, a position of the multimedia content, and a state of the multimedia content to start the presentation of the multimedia content. Subsequently, the operations can include transmitting the multimedia content synchronization request to the second media device.

An example embodiment is directed to a non-transitory computer-readable medium having instructions stored thereon that, when executed by a computing device, cause the computing device to perform operations for synchronizing a simultaneous presentation of multimedia content across multiple media devices. The operations can include generating a multimedia content synchronization request configured to instruct a second media device to synchronize a presentation of multimedia content on the second media device with a first media device. The multimedia content synchronization request can include a deep link indicative of a channel of the multimedia content, a position of the multimedia content, and a state of the multimedia content to start the presentation of the multimedia content. Subsequently, the operations can include transmitting the multimedia content synchronization request to the second media device.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
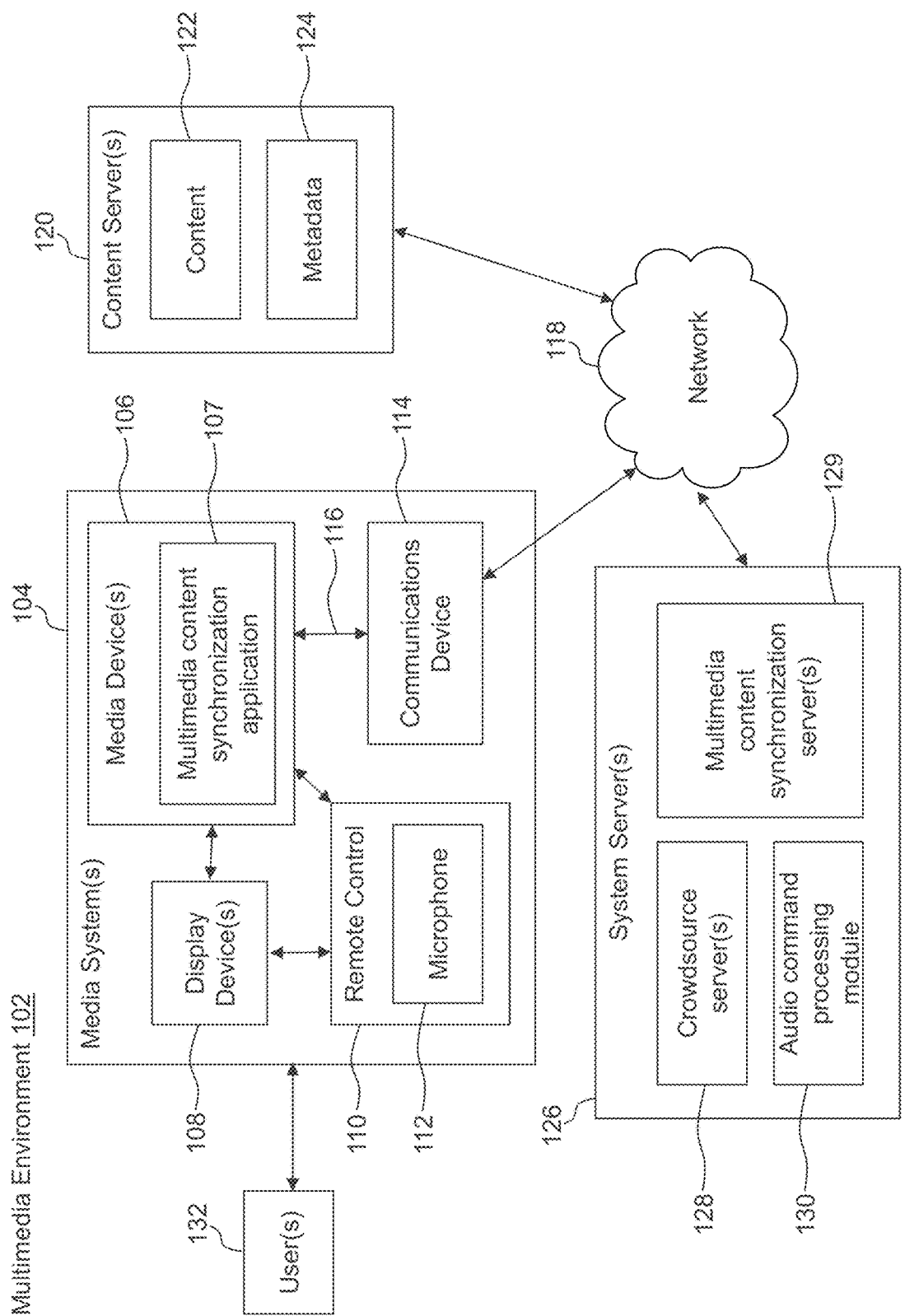
FIG. 1 illustrates a block diagram of a multimedia environment, according to some embodiments.

Provided herein are system, apparatus, device, method and/or computer program product embodiments, and/or combinations and sub-combinations thereof, for synchronizing the simultaneous presentation of multimedia content across multiple devices. For instance, the disclosed embodiments may provide for implementing a "watch party," a way for users to watch content together. In one illustrative and non-limiting example embodiment, a viewer can invite friends with a uniform resource locator (URL) that takes them right to a watch party from their home in which all viewers can watch the same content together and chat right on the screen via their phones (e.g., chat bubbles show up on the TV screen together with, in some aspects, faces, video, and/or audio). An example user workflow for this example embodiment may begin with a host (e.g., a Roku user)

creating a watch party for any content in any channel on a Roku device. Next, the host may invite users to the watch party. Those users may receive a message (e.g., text, email, etc.) containing a link (e.g., URL) to the watch party and the start time of the watch party. Subsequently, the user can sit in front of the TV screen coupled to their Roku device at the designated start time and click on the watch party link (e.g., on their phone or tablet). The watch party link can open a chat room (e.g., on their phone or tablet). Users can type messages into the chat room and those messages can appear in the chat room and on the TV (e.g., in chat bubbles over the video), or separately in a mobile application executing on the users' user devices (and not on the TV). Playback of the video then begins on the users' TV screens (e.g., when a user owns several TVs, the systems and techniques disclosed herein can prompt the user "Which TVs or display screens would you like to play the watch party on?" and then "Would you like to view chat messages on your user device, TV, or both?"). The video can be in sync if the user has the appropriate subscription and channel installed, which may be different for different users (e.g., some users may watch the video on one channel, while other users may watch the video on a different channel or sub-channel (e.g., different content provider, closed captioning, different localization, different language, ad-supported channel versus ad-free channel, etc.)). If they do not, they may be prompted to install the appropriate channel and subscribe. During the watch party, any user can control the position of the video using their remote, and those changes can occur on all the connected devices (e.g., if one user pauses the video, it pauses for everyone).

In some embodiments, the disclosed embodiments may implement the watch party as an application built into the player software development kit (SDK) at the operating system (OS) level or provided as a third-party service. Optionally, individual channels cannot access the chat messages. The disclosed embodiments can implement chat according to the following example techniques: (i) peer-to-peer communications (e.g., using web real-time communication (webRTC), raw user datagram protocol (UDP), or any other suitable peer-to-peer communications protocol); (ii) publishing the messages and video position data to Roku's servers, where the Roku devices poll for, or listen to, and act on the updates.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may include a multimedia content synchronization application 107 for synchronizing a simultaneous presentation of multimedia content across multiple media devices 106. In one example, each multimedia content synchronization application 107 may be built into the SDK of each media device 106 at the OS level. In another example, each multimedia content synchronization application 107 may be a third-party service, using the facilities provided by the OS, provided that the facilities include other applications' support for deep linking and content identification. In some embodiments, content identification may be implemented by (i) taking a "metadata fingerprint" of a movie, including title, year, director, studio and cast, (ii) running a fuzzy match, and (iii) identifying the movie with a very high degree of confidence (e.g., a degree of confidence value that exceeds a predetermined threshold value). By using such a content identification technique, the multimedia content synchronization application 107, the one or more multimedia content synchronization servers 129, or both can determine automatically, and without user input, whether the movie "Alien" on one channel is the same as the movie "Alien" on a different channel or service, even if the second channel or service is in a different geographic region and language. In another example, this content identification data may be crowdsourced: one user in the watch party may say, "Everybody start 'Alien' on your TVs," and the multimedia content synchronization application 107, the one or more multimedia content synchronization servers 129, or both may take on further synchronization and collect the correspondence data, such as by querying the internal ID of the currently playing movie from a service application.

Each multimedia content synchronization application 107 executing on each media device 106 may be configured to generate a multimedia content synchronization request configured to instruct other multimedia content synchronization applications 107 executing on other media devices 106 to synchronize a presentation (e.g., playback) of multimedia content on all of the media devices 106 that have received the multimedia content synchronization request. Generally, the multimedia content synchronization request can include a link to enter or join the watch party, a deep link which contains the data needed to synchronize the streams, any other suitable electronic information, or any combination thereof. The multimedia content synchronization request can be configured to instruct other media devices 106 to synchronize a presentation of multimedia content, such as a TV show or movie. In some aspects, the multimedia content synchronization request can include a deep link indicative of a channel (e.g., broadcast, cable, or application channel or sub-channel), position (e.g., hh:mm:ss), and/or state (e.g., display size, aspect ratio, on-screen position, volume level, language, closed captioning on/off, etc.) of the multimedia content to start the presentation of the multimedia content. Subsequently, the multimedia content synchronization application 107 can transmit, via network 118, the multimedia content synchronization request to the other multimedia content synchronization applications 107 of the other media devices 106, either directly (e.g., peer-to-peer synchronization) or indirectly via one or more multimedia content synchronization servers 129 (e.g., server-based synchronization).

Each media device 106 may be configured to communicate with network 118 via a communications device 114. The communications device 114 may include, for example, a cable modem or satellite TV transceiver. The media device 106 may communicate with the communications device 114 over a communications path 116, wherein the communications path 116 may include wireless (such as Wi-Fi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below. As used herein, the term "remote control" refers to any device that can be used to control the media device 106, such as a virtual remote on any client device (e.g., smart phone, tablet, etc.) with features that include, for example, video capture and presentation, audio capture and presentation, chat capture and presentation, and other suitable features.

The multimedia environment 102 may include a plurality of content servers 120 (also called content providers or sources). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 includes data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing and watch party embodiments and, thus, the system servers 126 may include one or more crowdsource servers 128 and one or more multimedia content synchronization servers 129.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The multimedia content synchronization server(s) 129 may be configured to synchronize a simultaneous presentation of multimedia content across multiple media devices 106. For example, in response to a user 132 indicating a desire to create a "watch party" for a particular multimedia content and identifying other users 132 to invite to the watch party, the multimedia content synchronization server(s) 129 may generate a multimedia content synchronization request configured to instruct multimedia content synchronization applications 107 executing on media devices 106 associated with those other users 132 to synchronize a presentation (e.g., playback) of multimedia content on all of their media devices 106. Subsequently, the multimedia content synchronization server(s) 129 can transmit, via network 118, the multimedia content synchronization request to the multimedia content synchronization applications 107 of the media devices 106 associated with the other users 132 invited to the watch party. Alternatively, in some embodiments, the multimedia content synchronization server(s) 129 may receive the multimedia content synchronization request from a particular multimedia content synchronization application 107 and transmit (e.g., multicast, unicast, etc.) the multimedia content synchronization request to the media devices of the other users 132 invited to join the watch party.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
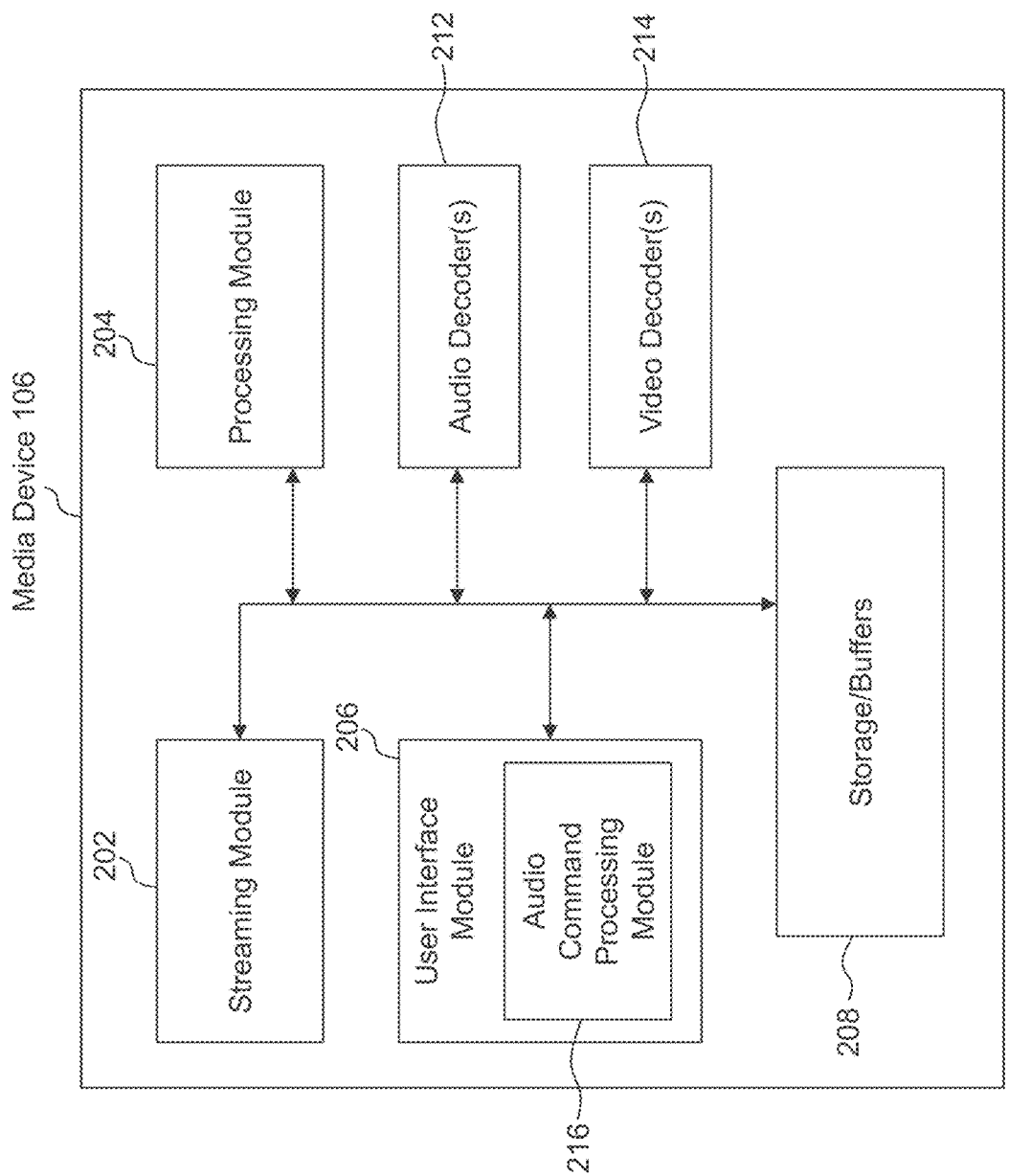
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples. Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Multimedia Content Synchronization

Referring to FIG. 1, the media devices 106 may exist in thousands or millions of media systems 104. Accordingly, the media devices 106 may lend themselves to watch party embodiments. In some embodiments, multimedia content synchronization applications 107 executing in the media devices 106 operate to synchronize the simultaneous presentation of multimedia content across multiple media devices 106. Additionally or alternatively, in some embodiments, one or more multimedia content synchronization servers 129 in the system servers 126 operate to synchronize the simultaneous presentation of multimedia content across multiple media devices 106.

Figure 3:
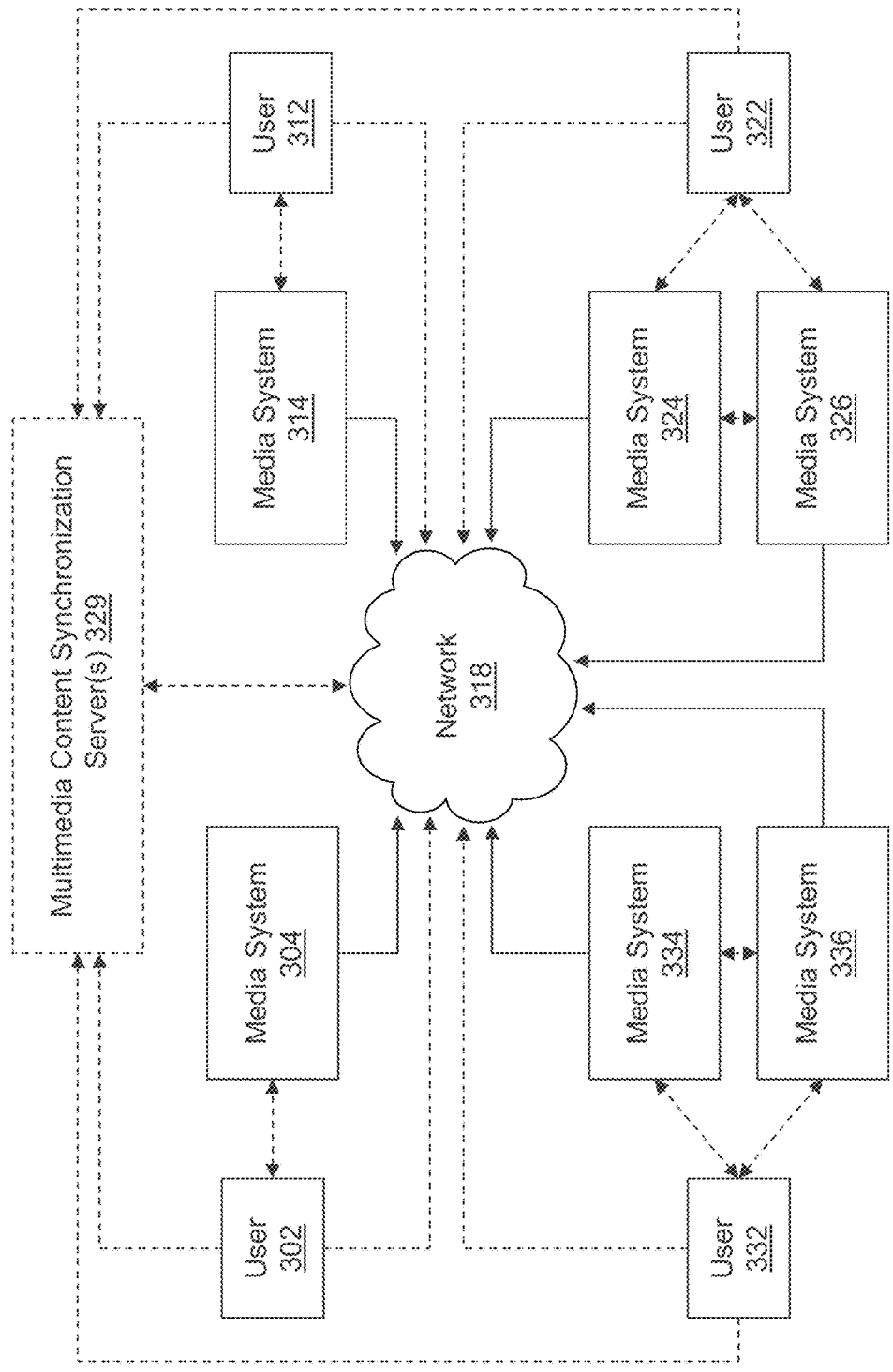
FIG. 3 illustrates a block diagram of another multimedia environment, according to some embodiments.

For example, FIG. 3 illustrates a block diagram of a multimedia environment 300, according to some embodiments. In a non-limiting example, multimedia environment 300 may be directed to synchronizing the streaming of multimedia content for multiple users. The multimedia environment 300 may include a first media system 304 associated with a first user 302. The multimedia environment 300 may further include a second media system 314 associated with a second user 312. The multimedia environment 300 may further include a third media system 324 and a fourth media system 326 associated with a third user 322 (e.g., two TV-based media systems located in two different rooms of the third user 322's home). The multimedia environment 300 may further include a fifth media system 334 and a sixth media system 336 (e.g. a mobile media system such as the fourth user 332's smartphone) associated with a fourth user 332.

Each of the first media system 304, the second media system 314, the third media system 324, the fourth media system 326, the fifth media system 334, and the sixth media system 336 may be located in, or associated with, a family room, a kitchen, a backyard, a home theater, a school classroom, a library, a car, a boat, a bus, a plane, a movie theater, a stadium, an auditorium, a park, a bar, a restaurant, a user's personal space, or any other location or space where it is desired to receive and present (e.g., display) multimedia content. Each of the first media system 304, the second media system 314, the third media system 324, the fourth media system 326, the fifth media system 334, and the sixth media system 336 may include one or more media devices 106 (e.g., each including a multimedia content synchronization application 107 built into the player SDK at the OS level or provided as a third-party service), display devices 108 for presenting multimedia content, remote controls 110 (e.g., each including a microphone 112) for controlling the presentation of multimedia content, and communications devices 114 for receiving and transmitting multimedia content, multimedia content synchronization requests, updates, messages (e.g., video, audio, and/or chat messages), and other suitable electronic information via network 318.

In various embodiments, the multimedia environment 300 may be configured to implement a "watch party" technique that synchronizes a simultaneous presentation of multimedia content across the media devices included in the media systems 304, 314, 324, 326, 334, and/or 336. In some embodiments, the multimedia environment 300 may be configured to implement the "watch party" technique by streaming the multimedia content (e.g., movie, TV show, etc.) from one or more content servers and presenting user-generated content such as text, video, and/or audio chat data in association with the streamed multimedia content.

The first user 302 may interact with the first media system 304 to select and consume multimedia content and, during a watch party, to view substantially synchronized multimedia content and interact (e.g., via video, audio, and/or chat messages) with the second user 312, the third user 322, and the fourth user 332. The second user 312 may interact with the second media system 314 to select and consume multimedia content and, during a watch party, to view substantially synchronized multimedia content and interact with the first user 302, the third user 322, and the fourth user 332. The third user 322 may interact with the third media system 324 and the fourth media system 326 to select and consume multimedia content and, during a watch party, to view substantially synchronized multimedia content and interact with the first user 302, the second user 312, and the fourth user 332. The fourth user 332 may interact with the fifth media system 334 and the sixth media system 336 to select and consume multimedia content and, during a watch party, to view substantially synchronized multimedia content and interact with the first user 302, the second user 312, and the third user 322.

In some embodiments, the first user 302 may utilize various components of the first media system 304 indicate a desire to create a watch party to view synchronized multimedia content, such as a TV show or movie, with the second user 312, the third user 322, and the fourth user 332. In response, the multimedia content synchronization application executing on the media device included in the first media system 304 may generate a multimedia content synchronization request configured to instruct the multimedia content synchronization applications executing on the media devices included in the second media system 314, the third media system 324, the fourth media system 326, the fifth media system 334, and the sixth media system 336 to synchronize a presentation (e.g., playback) of the multimedia content.

Additionally or alternatively, the multimedia content synchronization server(s) 329 may generate, or assist in the generation of, the multimedia content synchronization request. As a person skilled in the relevant art(s) would understand, the multimedia content synchronization server(s) 329 are optional and not required, such as in peer-to-peer implementations of the watch party techniques described herein. Additionally or alternatively, the first user 302 may communicate directly with the multimedia content synchronization server(s) 329 to create a watch party, and the multimedia content synchronization server(s) 329 may send the multimedia content synchronization request to the other users 312, 322, and 332. This technique may be useful in situations when a user cannot communicate electronically with their media system, but can communicate electronically with the multimedia content synchronization server(s) 329.

In some embodiments, the multimedia content synchronization request can include a URL deep link indicative of a channel (e.g., broadcast, cable, or application channel or sub-channel), position (e.g., hours:minutes:seconds (hh:mm:ss)), and/or state (e.g., display size, aspect ratio, on-screen position, volume level, language, closed captioning on/off, etc.) of the multimedia content to start the presentation of the multimedia content. In some embodiments, the multimedia content synchronization request can be further configured to open a chat room on the smartphones, tablet computing devices, or other chat clients of the users 302, 312, 322, and 332, and they can input (e.g., type or speak) messages that appear in the chat room and on the display devices coupled to the media devices included in the media systems 304, 314, 324 (and/or 326), and 334 (and/or 336) (e.g., text over video such as in chat bubbles over the video content, subtitles, side bar, video over video such as realtime video of users 302, 312, 322, and 332 over the video being watched, etc.). Additionally or alternatively, one or more of the media systems 304, 314, 324 (and/or 326), and 334 (and/or 336) may include a microphone and/or video camera for capturing messages from the users 302, 312, 322, and 332.

In some embodiments (e.g., peer-to-peer synchronization), the multimedia content synchronization application executing on the media device included in the first media system 304 can transmit, via network 318, the multimedia content synchronization request directly to the multimedia content synchronization applications executing on the media devices included in the media systems 304, 314, 324 (and/or 326), and 334 (and/or 336).

In other embodiments (e.g., server-based synchronization), the multimedia content synchronization server(s) 329 can transmit, via network 318, the multimedia content synchronization request to the multimedia content synchronization applications executing on the media devices included in the media systems 304, 314, 324 (and/or 326), and 334 (and/or 336). Additionally or alternatively, in some embodiments, the multimedia content synchronization server(s) 329 may receive the multimedia content synchronization request from the first media system 304. The multimedia content synchronization server(s) 329 then may analyze a database of users and media devices to identify the media systems 314, 324, 326, 334, and 336 as containing the media devices of the users 312, 322, and 332 invited to join the watch party. Subsequently, the multimedia content synchronization server(s) 329 may transmit the multimedia content synchronization request to the media systems 304, 314, 324 (and/or 326), and 334 (and/or 336).

In some embodiments, the multimedia environment 300 can implement peer-to-peer multimedia content synchronization and chat using a peer-to-peer communications protocol, where multimedia content position data and chat messages (e.g., video chat, audio chat, textual chat, or any combination thereof) are exchanged between the multimedia content synchronization applications executing on the media devices included in the media systems 304, 314, 324, 326, 334, and 336 without those chat messages being transmitted to or stored elsewhere. In some embodiments, a peer-to-peer communications protocol may also be used to broadcast the multimedia content position data and chat messages to the user devices of the users 302, 312, 332, and 322 for syncing the chat on those user devices.

In other embodiments, the multimedia environment 300 can implement server-based multimedia content synchronization and chat by publishing multimedia content position data and chat messages to the multimedia content synchronization server(s) 329, where the multimedia content synchronization applications executing on the media devices included in the media systems 304, 314, 324, 326, 334, and 336 can poll for and act on the updates. In some embodiments, a peer-to-peer communications protocol may also be used to poll for the multimedia content position data and chat messages for syncing the chat on the user devices of the users 302, 312, 332, and 322.

Once the start time specified in the multimedia content synchronization request arrives, the synchronized presentation of the multimedia content on the media devices included in the media systems 304, 314, 324 (and/or 326), and 334 (and/or 336) can begin.

In one example, when generating the multimedia content synchronization request, the first user 302 may indicate that the multimedia content is to be started automatically on the first media system 304. The media device included in the first media system 304 then can automatically, and without input from the first user 302, begin the presentation of the multimedia content once the start time arrives.

In another example, when receiving the multimedia content synchronization request, the second user 312 may indicate that the multimedia content is to be started on the second media system 314 after displaying a prompt (e.g., "Would you like to join your Roku Watch Party now?"). Once the start time arrives, the media device included in the second media system 314 can display the prompt, receive an affirmative confirmation from the second user 312 responsive to the prompt (e.g., "Yes" or "Start"), and then begin the presentation of the multimedia content.

In yet another example, when receiving the multimedia content synchronization request, the third media system 324, the fourth media system 326, or both may display a prompt (e.g., "On which TV would you like to join your Roku Watch Party?"), and the third user 322 may indicate that the multimedia content is to be started automatically on the third media system 324. The media device included in the third media system 324 then can automatically, and without input from the third user 322, begin the presentation of the multimedia content once the start time arrives.

In yet another example, manually starting content playback may be useful when the first user 302 wants to wait for everyone to arrive before starting the show. At the start of the watch party, the users 302, 312, 332, and 322 can sit in front of the display devices of their media systems 304, 314, 324, 326, 334, and 336 and can chat to each other, but the video playback may not start until the first user 302 explicitly starts playback by clicking a start or play button on their remote control. As a result, the start of the watch party (e.g., chat enabled) may be differentiated from the start of the multimedia content stream (e.g., tv show or moving being watched).

Yet another example relates to users who arrive after playback has started. If a user arrives five minutes after the video begins, they may miss the first five minutes of the movie so that their multimedia content stream is in sync with the other users of the watch party. In some aspects, the late user can opt to catch up by watching the video at a faster speed (e.g., 1.5× or 2×).

In still another example, after receiving the multimedia content synchronization request, the fourth user 332 may not respond to the multimedia content synchronization request. Once the start time arrives, or shortly before (e.g., five minutes before, one minute before, etc.), the media device included in the fifth media system 334, the sixth media system 336, or both can display a prompt (e.g., "You have been invited to a Roku Watch Party that is about to begin. Would you like to join your Roku Watch Party on this device?"). The fourth user 332 may respond affirmatively to the prompt using the sixth media system 336 (e.g., "Yes" or "Start"). As a result, the presentation of the multimedia content may begin on the sixth media system 336 rather than the fifth media system 334.

The multimedia content can be in sync if the users 302, 312, 322, and 332 each have the appropriate subscription and channel installed.

For example, in various scenarios, the multimedia content may be available in a first version on a first channel (e.g., an English-language version of the multimedia content on a first sub-channel of the first channel). The multimedia content also may be available in a second version on the first channel (e.g., a Spanish-language version of the multimedia content on a second sub-channel of the first channel). The multimedia content also may be available in a third version (e.g., an extended-play or director's cut version) on a second channel different from the first channel.

The first user 302 may be subscribed to the first channel with a language-preference set to English, and, as a result, the first media system 304 can present the first version of the multimedia content on the first channel during the watch party.

The second user 312 also may be subscribed to the first channel but with a language-preference set to Spanish, and, as a result, the second media system 314 can present the second version of the multimedia content on the first channel during the watch party.

The third user 322 may be subscribed to the second channel but not the first channel, and, as a result, the third media system 324, the fourth media system 326, or both can present the third version of the multimedia content on the second channel during the watch party.

The fourth user 332 may be subscribed to neither the first nor the second channel. As a result, the multimedia content synchronization application executing on the media device included in the fifth media system 334 or the sixth media system 336 (and/or, in some aspects, the multimedia content synchronization server(s) 329) can prompt the fourth user 332 to subscribe to the first channel, the second channel, or a third channel hosting the multimedia content. In response to the fourth user 332 indicating an affirmative confirmation responsive to the prompt (e.g., "Yes, subscribe me to the second channel"; selecting an icon associated with the second channel and entering a personal identification number (PIN); etc.), the multimedia content synchronization application executing on the media device included in the fifth media system 334 or the sixth media system 336 (or, in some aspects, the multimedia content synchronization server(s) 329) can install the channel selected by the fourth user 332 on the fifth media system 334 and the sixth media system 336. Additionally or alternatively, the fourth user 332 may have access to the multimedia content on a digital video disc (DVD) or a locally-stored copy of the multimedia content and, as a result, the fifth media system 334, the sixth media system 336, or both can present the DVD or locally-stored copy of the multimedia content during the watch party (e.g., using a sequence of high-definition multimedia interface (HDMI) consumer electronics control (CEC) control signals).

Once playback of the multimedia content begins, any of the users 302, 312, 322, and 332 can control the position of the multimedia content using their remote, and those changes can occur on all the connected devices via circulation of an updated multimedia content synchronization request.

In one illustrative and non-limiting example, the multimedia content synchronization application executing on any media device included in the media system 304, 314, 324, 326, 334, or 336 (or, in some aspects, the multimedia content synchronization server(s) 329) can instruct all connected media devices to start a particular video in a particular position in a particular channel or application. When the video plays on multiple networks, one user could watch the video on a first channel, another user could watch the video on a second channel, and so forth. Further, when the video is available in multiple versions, one user could watch a standard edition of the video, another user could watch an extended edition of the video, and so forth. In some embodiments, the multimedia content synchronization application executing on any media device included in the media system 304, 314, 324, 326, 334, or 336 (or, in some aspects, the multimedia content synchronization server(s) 329) can send a multimedia content synchronization request to all invited media devices.

In some embodiments, the multimedia content synchronization request may upsell the user in the invitation itself rather than at the start of the watch party. This technique may be useful when watch parties are scheduled many days or months in advance.

In some embodiments, the multimedia content synchronization request may indicate that all invited media devices are going to begin watching the video at a particular time. In some embodiments, the multimedia content synchronization request may further indicate all of the channels that have a version of the video (e.g., determined by analyzing a database of multimedia content). In some embodiments, the multimedia content synchronization request may further indicate, of all of the channels that have a version of the video, which channels each of the users 302, 312, 322, and 332 have subscriptions or access to (e.g., determined by analyzing a database of user subscriptions). In some embodiments, the multimedia content synchronization request may further indicate whether any of the users 302, 312, 322, and 332 do not have subscriptions or access to any channel that has a version of the video so that any user without access to the video is sent a message asking if they would like to subscribe to a channel that has a version of the video (e.g., upsell the user to subscribe to the network, or give the user a free trial).

In some embodiments, the third user 322 may have two media systems, including the third media system 324 in one room and the fourth media system 326 in another room. The third user 322 can click on, or otherwise execute, the multimedia content synchronization request and receive a notification that states "You have two Rokus TVs in your home, which one would you like to watch it on?" The third user 322 then may select either the third media system 324 or the fourth media system 326 (or both, if the third user 322 is having a large gathering, for example) for watching the synchronized video content. Subsequently, the third user 322 may switch which media system the user is watching the video on using a handoff technique.

In some embodiments, the fourth user 332 may have two media systems, such as the fifth media system 334 in one room and the sixth media system 336 which is mobile and movable between rooms (e.g., the user's smartphone or tablet). The fourth user 332 can begin to watch the video on the fifth media system 334. Subsequently, the fourth user 332 may say "Now I want to connect to my phone as well" and the playback of the video can switch from the fifth media system 334 to the sixth media system 336 using a handoff technique (e.g., from an app executing on the fifth media system 334 to a different app executing on the sixth media system 336). Alternatively, the playback may continue on both the fifth media system 334 and the sixth media system 336, so that the fourth user 332 may continue watching the video while moving to a different room.

In some embodiments, the multimedia content synchronization application executing on any media device included in the media system 304, 314, 324, 326, 334, or 336 (or, in some aspects, the multimedia content synchronization server(s) 329) can synchronize video across media devices that have different channels (e.g., different content providers and/or applications), internet speeds, and other characteristics. For example, the multimedia content synchronization application executing on any media device included in the media system 304, 314, 324, 326, 334, or 336 (or, in some aspects, the multimedia content synchronization server(s) 329) can periodically synchronize the video and insert filler content to account for gaps (e.g., playing a two-second message on a first device when a second media device is two seconds behind the first media device). This filler content technique can also operate to synchronize playback when one user is playing a standard version of a movie (or other content), and another user is playing an extended version of the movie (e.g., wherein filler content is inserted into the standard version playback to keep playback of both versions synchronized).

Additionally or alternatively, in some embodiments, the multimedia content synchronization application executing on any media device included in the media system 304, 314, 324, 326, 334, or 336 (or, in some aspects, the multimedia content synchronization server(s) 329) can increase the playback speed on the slower device. For example, if the media system 334 has an interrupted internet connection, and the media system 304 does not have an interrupted internet connection, the multimedia content synchronization application executing on the media system 334 (or, in some aspects, the multimedia content synchronization server(s) 329) can play the multimedia content in double speed once the media system 334's internet connection returns until the media system 334 catches up to the playback position of the media system 304 (e.g., instead of pausing playback for the media system when the media system 334's internet connection stalls).

In some embodiments, the multimedia content synchronization application executing on any media device included in the media system 304, 314, 324, 326, 334, or 336 (or, in some aspects, the multimedia content synchronization server(s) 329) can support voice control such that when the user 302, 312, 322, or 332 says "I have to step out of the room," "Let's pause the video," or any other such utterance, the video can be paused for all users. Such pauses are also helpful to catch up synchronization among playbacks, if needed (e.g., instead of or in addition to the filler content approach discussed above).

In some embodiments, the multimedia content synchronization request may set up a predetermined amount of intermissions within the video (e.g., a ten minute intermission every hour, etc.), and when one of the users 302, 312, 322, or 332 pauses the video, that pause will cut into their intermission so that all users may begin synchronized playback of the video after the intermission. For example, if the first user 302 pauses the video before the first intermission for one minute, and the other users 312, 322, and 332 keep playing the video, then the first user 302 may reach the intermission one minute after the other users 312, 322, and 332. This may cut into one minute of the first user 302's intermission to thereby synchronize the video playback of the first user 302 with the video playback of the other users 312, 322, and 332. Subsequently, after the intermission, all of the users 302, 312, 322, and 332 may begin playback at the same video position. Additionally or alternatively, in some embodiments, the multimedia content synchronization applications executing on the media devices included in the media systems 304, 314, 324, 326, 334, and 336 (and/or, in some aspects, the multimedia content synchronization server(s) 329) can utilize such an intermission technique to account for a video having different versions (e.g., standard and extended play). For example, users watching standard-play versions of the video may receive longer intermissions, and users watching extended-play versions of the video may receive shorter intermissions. In some embodiments, when a user's video is not synchronized with other users, the multimedia content synchronization applications executing on the media device included in the media systems 304, 314, 324, 326, 334, and 336 (and/or, in some aspects, the multimedia content synchronization server(s) 329) may display a synchronization message such as "You are not synchronized. Click here to synchronize, or wait until the next intermission." And then the respective multimedia content synchronization application may synchronize the video according to the user's response to the message.

In some embodiments, the multimedia content synchronization applications executing on the media devices included in the media systems 304, 314, 324, 326, 334, and 336 (and/or, in some aspects, the multimedia content synchronization server(s) 329) can utilize end-to-end encryption and encrypted storage to provide privacy for synchronization and chat data.

In some embodiments, if utilizing peer-to-peer synchronization, the media systems 304, 314, 324, 326, 334, and 336 can store synchronization and chat data in local, temporary storage (e.g., storage/buffers 208) without storing any data on (or, in some aspects, even without transmitting any data to) the multimedia content synchronization server(s) 329. In some embodiments, if utilizing server-based synchronization, the multimedia content synchronization server(s) 329 can temporarily store synchronization and chat data until the end of the watch party, at which point the data can be deleted.

Figure 4:
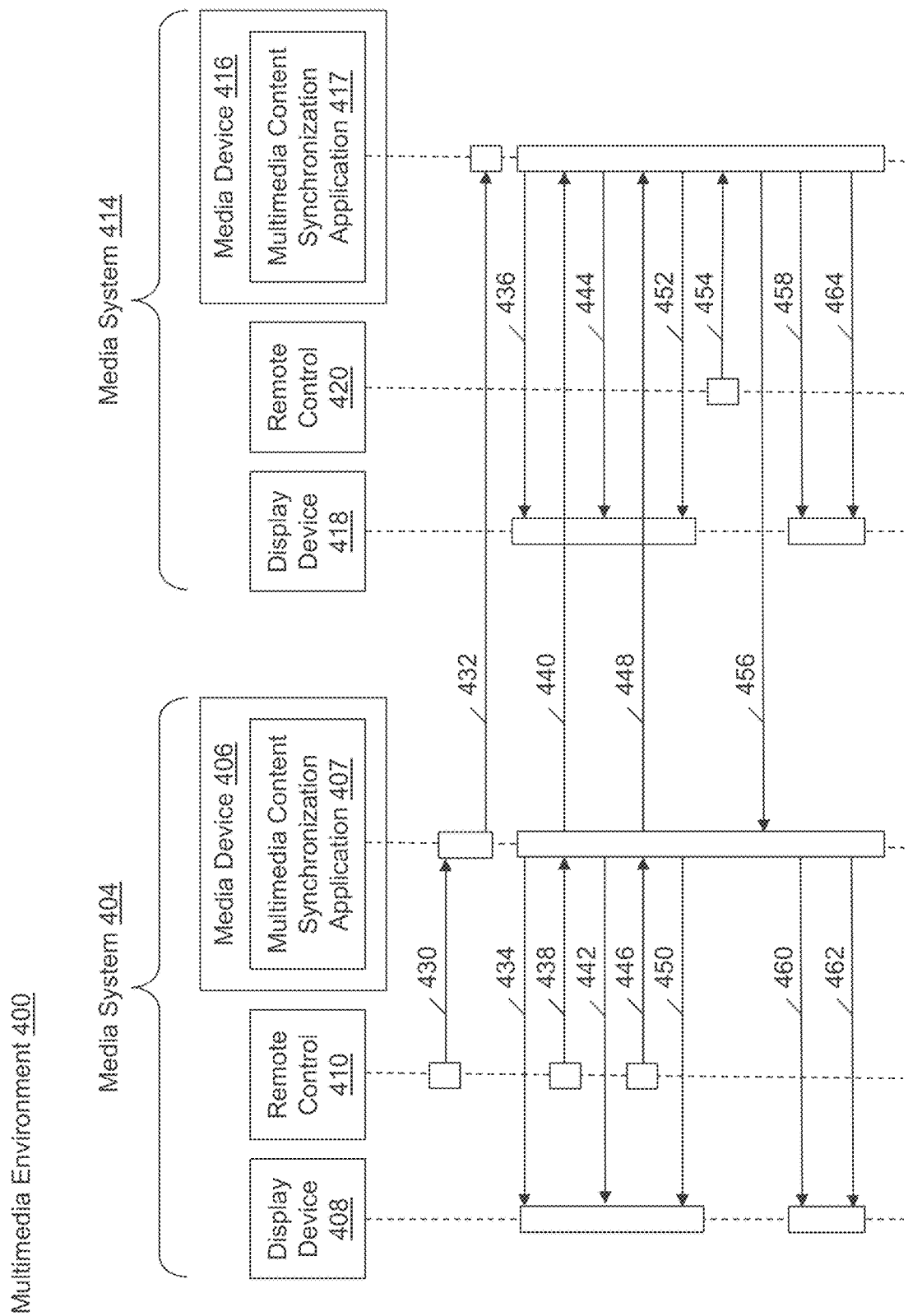
FIG. 4 illustrates interactions between a first media device and a second media device, according to some embodiments.

FIG. 4 illustrates interactions between a first media system 404 and a second media system 414 in a multimedia environment 400 to synchronize the playback of multimedia content during a watch party, according to some embodiments. The first media system 404 can be associated with a first user and include a first media device 406, a first multimedia content synchronization application 407 executing on the first media device 406, a first remote control 410, and a first display device 408. The second media system 414 can be associated with a second user and include a second media device 416, a second multimedia content synchronization application 417 executing on the second media device 416, a second remote control 420, and a second display device 418.

In some embodiments, the first user may utilize the first remote control 410 to indicate a desire to create a watch party to view synchronized multimedia content, such as a TV show or movie, with the second user of the second media system 414. In response, the first multimedia content synchronization application 407 may generate a first multimedia content synchronization request 432 configured to instruct the second multimedia content synchronization application 417 to synchronize a presentation (e.g., playback) of the multimedia content. In some embodiments, the first multimedia content synchronization request 432 can include a URL deep link indicative of a channel, position, and/or state of the multimedia content to start the presentation of the multimedia content. In some embodiments, the first multimedia content synchronization request 432 can be further configured to open a chat room on the smartphones, tablet computing devices, or other chat clients of the first and second users.

In some aspects, when the watch party is entered from the first multimedia content synchronization request 432 (e.g., an invitation link), a sequence of actions may be performed according to one of the following example embodiments.

1. In a first example embodiment, when a watch party is initiated via the second user's client device (e.g., tablet, smart phone), the second user can click the first multimedia content synchronization request 432 using the second user's client device, and it can open a multimedia content synchronization application (e.g., mobile web app or native) on the second user's client device. The multimedia content synchronization application executing on the second user's client device can contain a chat client and also can be capable of communicating with the second multimedia content synchronization application 417 on the second media device 416 (e.g., over webRTC, raw UDP, or http(s)). The multimedia content synchronization application executing on the second user's client device can send the information to the multimedia content synchronization application 417 on the second media device 416 so that it can initiate the watch party.

2. In a second example embodiment, when a watch party is initiated via the second remote control 420, the multimedia content synchronization application 417 on the second media device 416 can detect whether the multimedia content synchronization application is open on the second user's client device (e.g., tablet, smart phone). If not, the multimedia content synchronization application 417 on the second media device 416 can prompt the second user on the second display device 418 to open the multimedia content synchronization application on the second user's client device.

The first multimedia content synchronization application 407 may transmit (e.g., using a peer-to-peer communications protocol) the first multimedia content synchronization request 432 to the second multimedia content synchronization application 417. In some embodiments (e.g., peer-to-peer synchronization), the first multimedia content synchronization application 407 can transmit, via a network, the first multimedia content synchronization request 432 directly to the second multimedia content synchronization application 417. In other embodiments (e.g., server-based synchronization), the first multimedia content synchronization application 407 may transmit, via a network, the first multimedia content synchronization request 432 to one or more multimedia content synchronization servers (not shown), which in turn can transmit, via the network, the first multimedia content synchronization request 432 to the second multimedia content synchronization application 417.

Once the start time specified in the first multimedia content synchronization request 432 arrives, the synchronized presentation of the multimedia content on the first media device 406 and the second media device begins. For instance, once the start time arrives, the first multimedia content synchronization application 407 can generate and transmit a first multimedia content presentation initiation signal 434 to the first display device 408 that instructs the first display device 408 to begin presenting the multimedia content. Substantially simultaneously, the second multimedia content synchronization application 417 can generate and transmit a second multimedia content presentation initiation signal 436 to the second display device 418 that instructs the second display device 418 to begin presenting the multimedia content.

In various scenarios, the multimedia content may be available in a first version on a first channel and in a second version on a second channel different from the first channel. The first user of the first media system 404 may be subscribed to the first channel, and, as a result, the first multimedia content presentation initiation signal 434 can instruct the first display device 408 to begin presenting the first version of the multimedia content on the first channel during the watch party. The second user of the second media system 414 may be subscribed to the second channel, and, as a result, the second multimedia content presentation initiation signal 436 can instruct the second display device 418 to begin presenting the second version of the multimedia content on the second channel during the watch party.

In some embodiments, to synchronize the presentation of the multimedia content during the watch party, the first multimedia content synchronization application 407 and the second multimedia content synchronization application 417 can implement a filler content technique and/or intermission technique as described above with reference to FIG. 3.

In some embodiments, the first user may utilize the first remote control 410 to generate a chat message 438 (e.g., by inputting a text chat message, recording an audio chat message, capturing a video chat message video chat message, or a combination thereof) and transmit the chat message 438 to the first multimedia content synchronization application 407. The first multimedia content synchronization application 407 then may generate chat data 440 including the video, audio, or textual payload of the chat message 438 and transmit the chat data 440 to the second multimedia content synchronization application 417. The first multimedia content synchronization application 407 can generate a first chat message presentation signal 442 based on the chat message 438 or the chat data 440 and transmit the first chat message presentation signal 442 to the first display device 408 to instruct the first display device 408 to present the chat message (e.g., in an on-screen overlay, chat bubble, side bar, etc.). Substantially simultaneously, or at substantially the same point in the presentation of the multimedia content that the chat message 438 was generated, the second multimedia content synchronization application 417 can generate a second chat message presentation signal 444 based on the chat data 440 and transmit the second chat message presentation signal 444 to the second display device 418 to instruct the second display device 418 to present the chat message.

In some embodiments, the presentation of the chat message on the first display device 408 may be made in substantially the same format as the presentation of the chat message on the second display device 418. In some embodiments, the presentation of the chat message on the first display device 408 may be made in a different format than the presentation of the chat message on the second display device 418. For example, the first chat message presentation signal 442 may instruct the first display device 408 to present the chat message in an on-screen overlay, and the second chat message presentation signal 444 may instruct the second display device 418 to present the chat message in a side bar display (e.g., based on a chat preference set by the second user). In some aspects, the chat may also update on any connected client devices (e.g., smart phones, tablets, etc.).

In some embodiments, the first user may utilize the first remote control 410 (e.g., by pressing a pause button or saying "Roku, pause," where "Roku" is a wake word) to generate a pause request 446 configured to pause the presentation of the multimedia content on the first display device 408. The first multimedia content synchronization application 407 can detect the pause request 446 and generate a second multimedia content synchronization request 448 configured to instruct the second multimedia content synchronization application 417 to pause the presentation of multimedia content on the second display device 418.

The first multimedia content synchronization application 407 may transmit (e.g., using a peer-to-peer communications protocol) the second multimedia content synchronization request 448 to the second multimedia content synchronization application 417. In some embodiments (e.g., peer-to-peer synchronization), the first multimedia content synchronization application 407 can transmit, via a network, the second multimedia content synchronization request 448 directly to the second multimedia content synchronization application 417. In other embodiments (e.g., server-based synchronization), the first multimedia content synchronization application 407 may transmit, via a network, the second multimedia content synchronization request 448 to one or more multimedia content synchronization servers (not shown), which in turn can transmit, via the network, the second multimedia content synchronization request 448 to the second multimedia content synchronization application 417.

The first multimedia content synchronization application 407 can generate a first pause signal 450 based on the pause request 446 or the second multimedia content synchronization request 448 and transmit the first pause signal 450 to the first display device 408 to instruct the first display device 408 to pause the presentation of the multimedia content. Substantially simultaneously, the second multimedia content synchronization application 417 can generate a second pause signal 452 based on the second multimedia content synchronization request 448 and transmit the second pause signal 452 to the second display device 418 to instruct the second display device 418 to pause the presentation of the multimedia content.

In some embodiments, the second user may utilize the second remote control 420 (e.g., by pressing a pause button or saying "Roku, unpause," where "Roku" is a wake word) to generate an unpause request 454 configured to unpause or otherwise resume the presentation of the multimedia content on the second display device 418. The second multimedia content synchronization application 417 can detect the unpause request 454 and generate a third multimedia content synchronization request 456 configured to instruct the first multimedia content synchronization application 407 to unpause or otherwise resume the presentation of multimedia content on the first display device 408.

The second multimedia content synchronization application 417 may transmit (e.g., using a peer-to-peer communications protocol) the third multimedia content synchronization request 456 to the first multimedia content synchronization application 407. In some embodiments (e.g., peer-to-peer synchronization), the second multimedia content synchronization application 417 can transmit, via a network, the third multimedia content synchronization request 456 directly to the first multimedia content synchronization application 407. In other embodiments (e.g., server-based synchronization), the second multimedia content synchronization application 417 may transmit, via a network, the third multimedia content synchronization request 456 to one or more multimedia content synchronization servers (not shown), which in turn can transmit, via the network, the third multimedia content synchronization request 456 to the first multimedia content synchronization application 407.

The second multimedia content synchronization application 417 can generate a first unpause signal 458 based on the unpause request 454 or the third multimedia content synchronization request 456 and transmit the first unpause signal 458 to the second display device 418 to instruct the second display device 418 to unpause or otherwise resume the presentation of the multimedia content. Substantially simultaneously, the first multimedia content synchronization application 407 can generate a second unpause signal 460 based on the third multimedia content synchronization request 456 and transmit the second unpause signal 460 to the first display device 408 to instruct the first display device 408 to unpause or otherwise resume the presentation of the multimedia content.

At the end of the multimedia content on the first display device 408, the first multimedia content synchronization application 407 can generate and transmit a first multimedia content presentation termination signal 462 to the first display device 408 that instructs the first display device 408 to stop presenting the multimedia content. In some embodiments, the first multimedia content presentation termination signal 462 can further instruct the first media device 406 to delete all synchronization and chat data stored in local, temporary storage (e.g., storage/buffers 208).

At the end of the multimedia content on the second display device 418, which may be at substantially the same time as or at a different time than the end of the presentation of the multimedia content on the first display device 408, the second multimedia content synchronization application 417 can generate and transmit a second multimedia content presentation termination signal 464 to the second display device 418 that instructs the second display device 418 to stop presenting the multimedia content. In some embodiments, the second multimedia content presentation termination signal 464 can further instruct the second media device 416 to delete all synchronization and chat data stored in local, temporary storage (e.g., storage/buffers 208).

Figure 5:
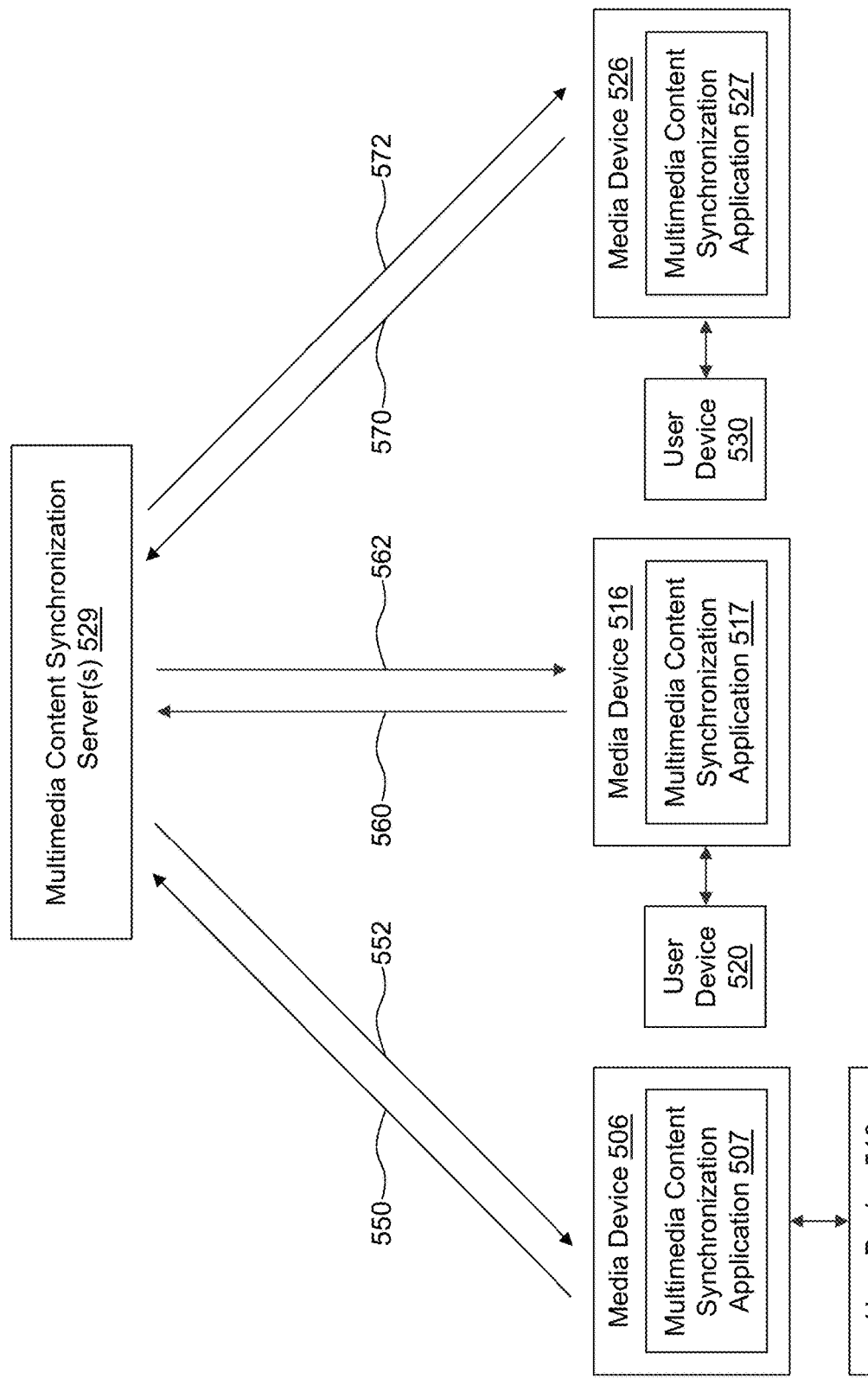
FIG. 5 illustrates a block diagram of another multimedia environment, according to some embodiments.

FIG. 5 illustrates a block diagram of a multimedia environment 500, according to some embodiments. In a non-limiting example, multimedia environment 500 may be directed to synchronizing an "on demand" multimedia (e.g., audio, video, or both) stream between multiple media devices, including play, pause, rewind, fast forward, and other functions, and synchronizing video, audio, and/or textual chat messages on multiple user devices. As a result, users can watch the synchronized multimedia content on their media devices (e.g., televisions) while chatting on their user devices (e.g., smartphones) so that the users' chat experience does not interfere with the users' multimedia viewing experience.

As shown in FIG. 5, the multimedia environment 500 may include a first media device 506 communicatively coupled to a first user device 510 operated by a first user, a second media device 516 communicatively coupled to a second user device 520 operated by a second user, and a third media device 526 communicatively coupled to a third user device 530 operated by a third user. Each of the first media device 506, the first user device 510, and the first user; the second media device 516, the second user device 520, and the second user; and the third media device 526, the third user device 530, and the third user may be located in, or associated with, a family room, a kitchen, a backyard, a home theater, a school classroom, a library, a car, a boat, a bus, a plane, a movie theater, a stadium, an auditorium, a park, a bar, a restaurant, a user's personal space, or any other location or space where it is desired to receive and present (e.g., display) multimedia content. For example, the first media device 506, the first user device 510, and the first user may be located in the living room of the first user's apartment; the second media device 516, the second user device 520, and the second user may be located in the basement of the second user's house; and the third media device 526, the third user device 530, and the third user may be located in the common room of the third user's university dormitory.

Each of the first media device 506, the second media device 516, and the third media device 526 may be smart television (e.g., Roku TV) or streaming device (e.g., Roku Express, Roku Ultra, Roku Premier, Roku Streaming Stick, Roku Streambar) that includes a respective multimedia content synchronization application built into the respective player SDK of each respective media device at the OS level. Each of the first user device 510, the second user device 520, and the third user device 530 may be a smart phone, smart watch, laptop, or tablet computing device that includes a respective mobile multimedia content synchronization application implemented in a respective application (e.g., Roku application) installed on the respective user device. In some embodiments, a respective user device and a respective media device may be implemented using the same computing device, such as when a user is viewing multimedia content streamed in the Roku Channel built into the Roku mobile app installed on the user's user device.

The first media device 506 may include a first multimedia content synchronization application 507 built into the player SDK of the first media device 506 at the OS level. The first user device 510 may include a first mobile multimedia content synchronization application built into a first application installed on the first user device 510 and in communication with the first multimedia content synchronization application 507.

The second media device 516 may include a second multimedia content synchronization application 517 built into the player SDK of the second media device 516 at the OS level. The second user device 520 may include a second mobile multimedia content synchronization application built into a second application installed on the second user device 520 and in communication with the second multimedia content synchronization application 517.

The third media device 526 may include a third multimedia content synchronization application 527 built into the player SDK of the third media device 526 at the OS level. The third user device 530 may include a third mobile multimedia content synchronization application built into a third application installed on the third user device 530 and in communication with the third multimedia content synchronization application 527.

In various embodiments, the multimedia environment 500 may be configured to implement a "watch party" technique that synchronizes a simultaneous presentation of multimedia content (e.g., movie, TV show, etc.) across the media devices 506, 516, and 526 and that further synchronizes a simultaneous presentation of user-generated chat content (e.g., real-time video calls, audio calls, and/or text messages) across the user devices 510, 520, and 530 in association with the streamed multimedia content.

Additionally or alternatively, the multimedia environment 500 may include one or more multimedia content synchronization servers 529 configured to implement server-based synchronization described herein by, for example, generating, or assisting in the generation of, multimedia content synchronization requests and further by receiving and transmitting multimedia content position data and chat messages (e.g., video chat, audio chat, textual chat, or any combination thereof). As a person skilled in the relevant art(s) would understand, the one or more multimedia content synchronization servers 529 are optional and not required, such as in implementations of the peer-to-peer synchronization techniques described herein. Additionally or alternatively, the first user device 510 may communicate directly with the multimedia content synchronization server(s) 529 to create a watch party, and the multimedia content synchronization server(s) 529 may send the multimedia content synchronization request to the other user devices 520 and 530. This technique may be useful in situations when a user cannot communicate electronically with their media device, but can communicate electronically with the multimedia content synchronization server(s) 529 (e.g., when users are outside of their homes but have their user devices with the Roku mobile app installed and connected to the multimedia content synchronization server(s) 529 via a wireless communications network).

In some embodiments, the first user may utilize the first user device 510 to create a watch party by highlighting a piece of content (e.g., movie, TV show on the Roku Channel), pressing the options (*) button that displays a popup having an option to start streaming or create a watch party, selecting the option to create a watch party, inviting the second and third users to join, and sending a multimedia content synchronization request to the second user device 520 (and/or the second media device 516) and the third user device 530 (and/or the third media device 526).

In some embodiments, the media devices 506, 516, and 526 may transmit requests, multimedia content position data, and chat data to the multimedia content synchronization server(s) 529 over communications paths 550, 560, and 570, respectively. In some embodiments, the media devices 506, 516, and 526 may receive (e.g., by polling for) multimedia content streams, control signals, and chat data from the multimedia content synchronization server(s) 529 over communications paths 552, 562, and 572, respectively.

In some embodiments, the multimedia content synchronization request can be further configured to open a chat room on the user devices 510, 520, and 530, and they can input or capture messages (e.g., audio/video streams, text messages) that appear in the chat room on the user devices 510, 520, and 530 in temporal association with the multimedia content being displayed on the media devices 506, 516, and 526, respectively (e.g., to avoid spoilers when one user's content stream is behind the content streams of the other users). Additionally or alternatively, one or more of the media devices 506, 516, and/or 526 may include a microphone and/or video camera for capturing messages from the respective users.

Figure 6:
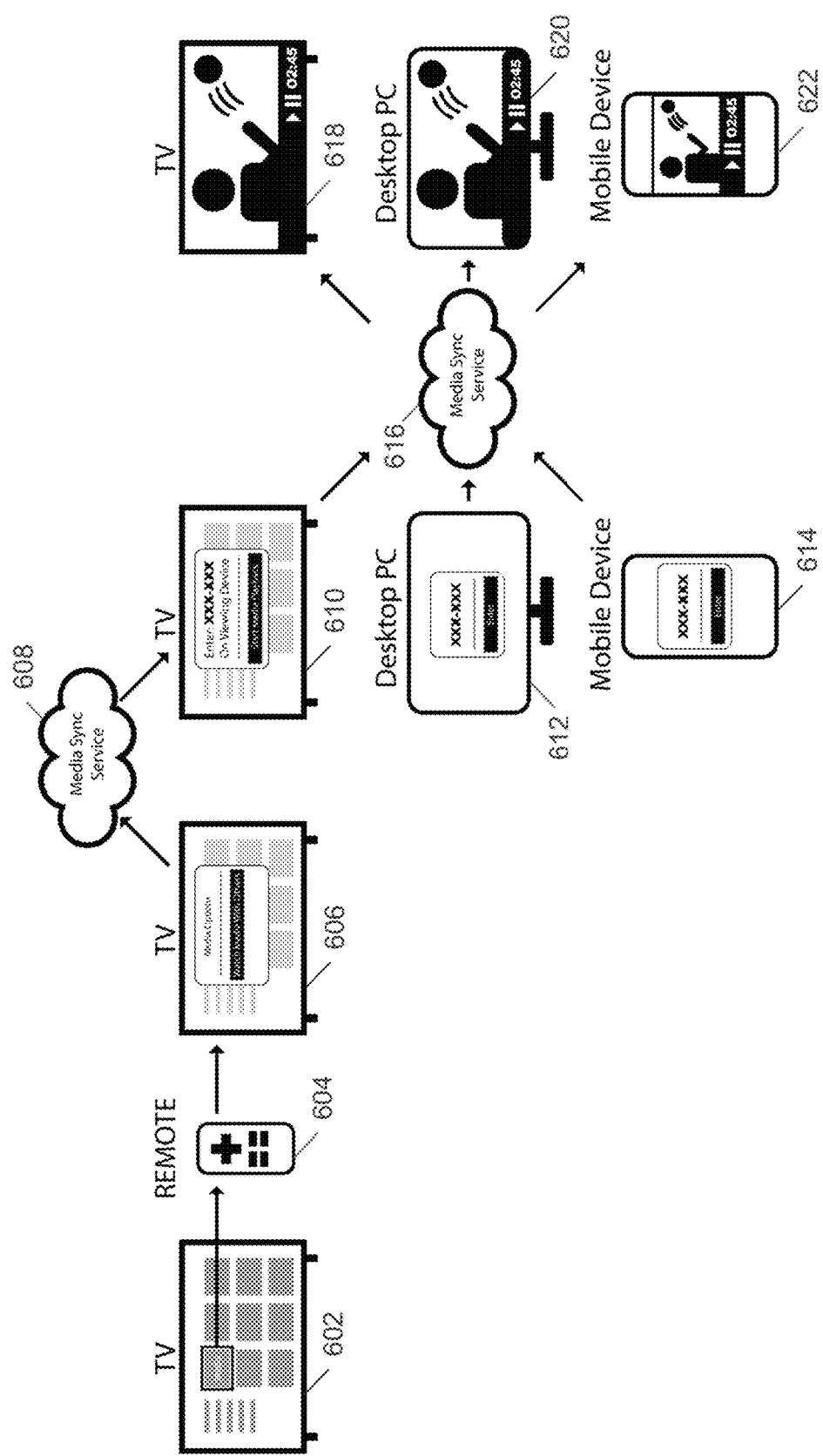
FIG. 6 illustrates interactions between user devices and a media sync service, according to some embodiments.

FIG. 6 illustrates a multimedia environment 600 to synchronize the playback of multimedia content during a watch party, according to some embodiments. In some embodiments, the multimedia environment 600 enables interactions between users watching synchronized multimedia content on their TVs, PCs, and mobile devices while chatting on their smartphones (e.g., so that the chat does not diminish the viewing experience).

At 602, a first user may select media within the user interface of their TV. At 604, the user may select media options with a remote control. At 606, the first user may select media options with the remote control (e.g., "Media Options">"Watch Media With Others"). At 608, the TV may send the request to "Watch Media With Others" to a media sync service, and the media sync service may send a sync identifier (e.g., "XXX-XXX" where "X" denotes a numeral between 0-9, a letter between A-Z, or a special character such as "%" or "!") to the media devices of the "Others."

At 610, the first user may enter the sync identifier (e.g., "Enter XXX-XXX On Viewing Device">"Start Media Playback") on the first user's TV to start the watch party. At 612, a second user may enter the sync identifier (e.g., "XXX-XXX">"Enter") on the second user's desktop PC to join the watch party. At 614, a third user may enter the sync identifier (e.g., "XXX-XXX">"Enter") on the third user's mobile device to join the watch party. At 616, the users' devices may transmit information to and receive information from the media sync service. At 618, the first user's TV may present synched media playback. At 620, the second user's desktop PC may present synched media playback. At 622, the third user's mobile device may present synched media playback.

Figure 7:
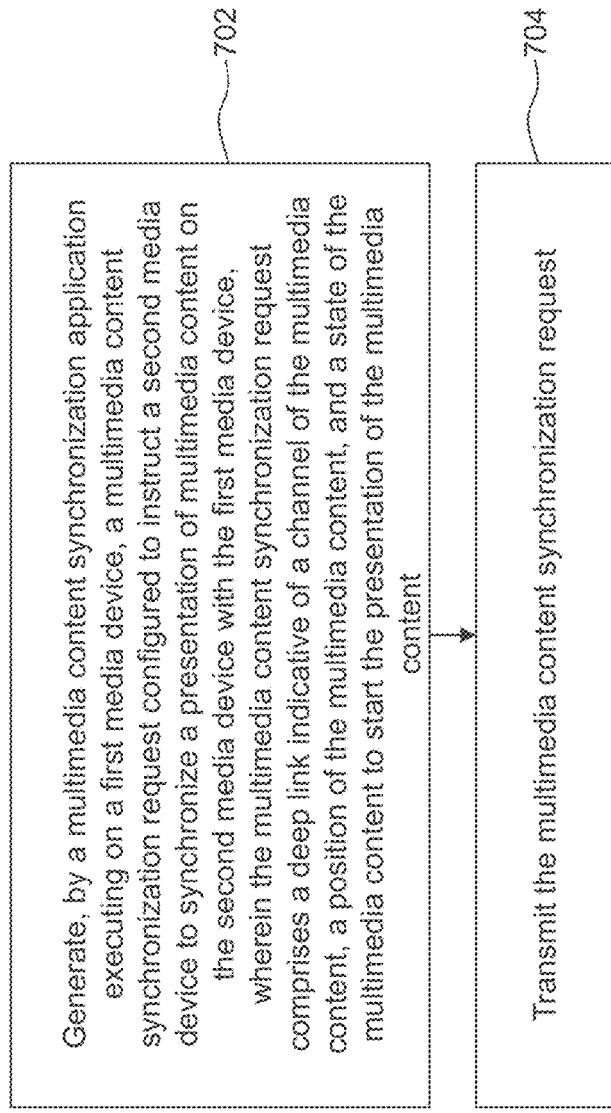
FIG. 7 is a flowchart illustrating a process for synchronizing the simultaneous presentation of multimedia content across multiple devices, according to some embodiments.

FIG. 7 is a flowchart for a method 700 for synchronizing the simultaneous presentation of multimedia content across multiple devices, according to an embodiment. Method 700 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art. Method 700 shall be described with reference to FIGS. 1, 3, and 4. However, method 700 is not limited to those example embodiments.

In 702, a multimedia content synchronization application (e.g., multimedia content synchronization application 107, 407) executing on a first media device (e.g., media device 106, 406) included in a first media system (e.g., media system 104, 304, 404) generates a multimedia content synchronization request (e.g., multimedia content synchronization request 432, 448, 456). The multimedia content synchronization request can be configured to instruct a second media device (e.g., media device 106, 416) included in a second media system (e.g., media system 104, 314, 414) to synchronize a presentation of multimedia content on the second media device with the first media device. The multimedia content may include, but is not limited to, for example, audio and/or video content (e.g., TV shows, movies, songs, podcasts, etc.), textual messages (e.g., chat messages), any other suitable content, or any combination thereof. In some aspects, the multimedia content synchronization request can include a deep link indicative of a channel (e.g., broadcast, cable, or application channel or sub-channel) of the multimedia content, a position (e.g., hours:minutes:seconds hh:mm:ss) of the multimedia content, and a state (e.g., display size, aspect ratio, on-screen position, volume level, closed captioning on/off, etc.) of the multimedia content to start the presentation of the multimedia content.

In some aspects, multimedia content synchronization request may be configured to synchronize the presentation of different versions of the same content on different media devices. For example, on the first media device, the multimedia content may correspond to a first channel (e.g., the "Roku Channel" application) having a first version of the multimedia content. On the second media device, the multimedia content may correspond to a second channel (e.g., an application channel different from the "Roku Channel" application, or a channel having an audio sub-channel in another language) having a second version of the multimedia content, where the second version is different from the first version (e.g., different language, content, length, bit rate, etc.). In such aspects, the multimedia content synchronization request can be configured to instruct the second media device to synchronize the presentation of the second version of the multimedia content on the second media device with the presentation of the first version of the multimedia content on the first media device.

In 704, the multimedia content synchronization application executing on the first media device transmits, via a network (e.g., network 118, 318), the multimedia content synchronization request to the second media device. The multimedia content synchronization application may transmit the multimedia content synchronization request to the second media device either directly (e.g., peer-to-peer synchronization) or indirectly (e.g., server-based synchronization) via one or more multimedia content synchronization servers (e.g., multimedia content synchronization server(s) 129, 329). For example, in a peer-to-peer based synchronization technique, the multimedia content synchronization application executing on the first media device may transmit the multimedia content synchronization request to the second media device without transmitting any information to a centralized server (e.g., the multimedia content synchronization server(s) 129 and 329 may be omitted from the multimedia environments 102 and 300, respectively). In another example, in a server-based synchronization technique, the multimedia content synchronization application executing on the first media device may transmit the multimedia content synchronization request to the one or more multimedia content synchronization servers, and the one or more multimedia content synchronization servers may transmit the multimedia content synchronization request to the second media device.

Optionally, the multimedia content synchronization application executing on the first media device can detect that the first media device has paused the presentation of the multimedia content and generate a second multimedia content synchronization request configured to instruct the second media device to pause the presentation of multimedia content on the second media device. In addition, optionally, the multimedia content synchronization application executing on the first media device can receive an electronic indication that the second media device has paused the presentation of the multimedia content and pause the presentation of multimedia content on the first media device. For instance, a second multimedia content synchronization application executing on the second media device can detect that the second media device has paused the presentation of the multimedia content, generate a second multimedia content synchronization request configured to instruct the first media device to pause the presentation of multimedia content, and transmit the second multimedia content synchronization request to the first media device, either directly (e.g., peer-to-peer synchronization) or indirectly via one or more multimedia content synchronization servers (e.g., server-based synchronization).

Optionally, the multimedia content synchronization application executing on the first media device can generate an electronic message configured to instruct the second media device to display the electronic message in association with the presentation of the multimedia content on the second media device. The electronic message can be, for example, textual messages (e.g., chat messages), user-related audio and/or video captured by microphones and/or cameras coupled to the media devices (e.g., users' facial and/or vocal reactions to the TV shows, etc.), any other suitable electronic information, or any combination thereof. Optionally, the multimedia content synchronization application executing on the first media device can transmit the electronic message to the second media device, either directly (e.g., peer-to-peer synchronization) or indirectly via one or more multimedia content synchronization servers (e.g., server-based synchronization).

Example Computer System

Figure 8:
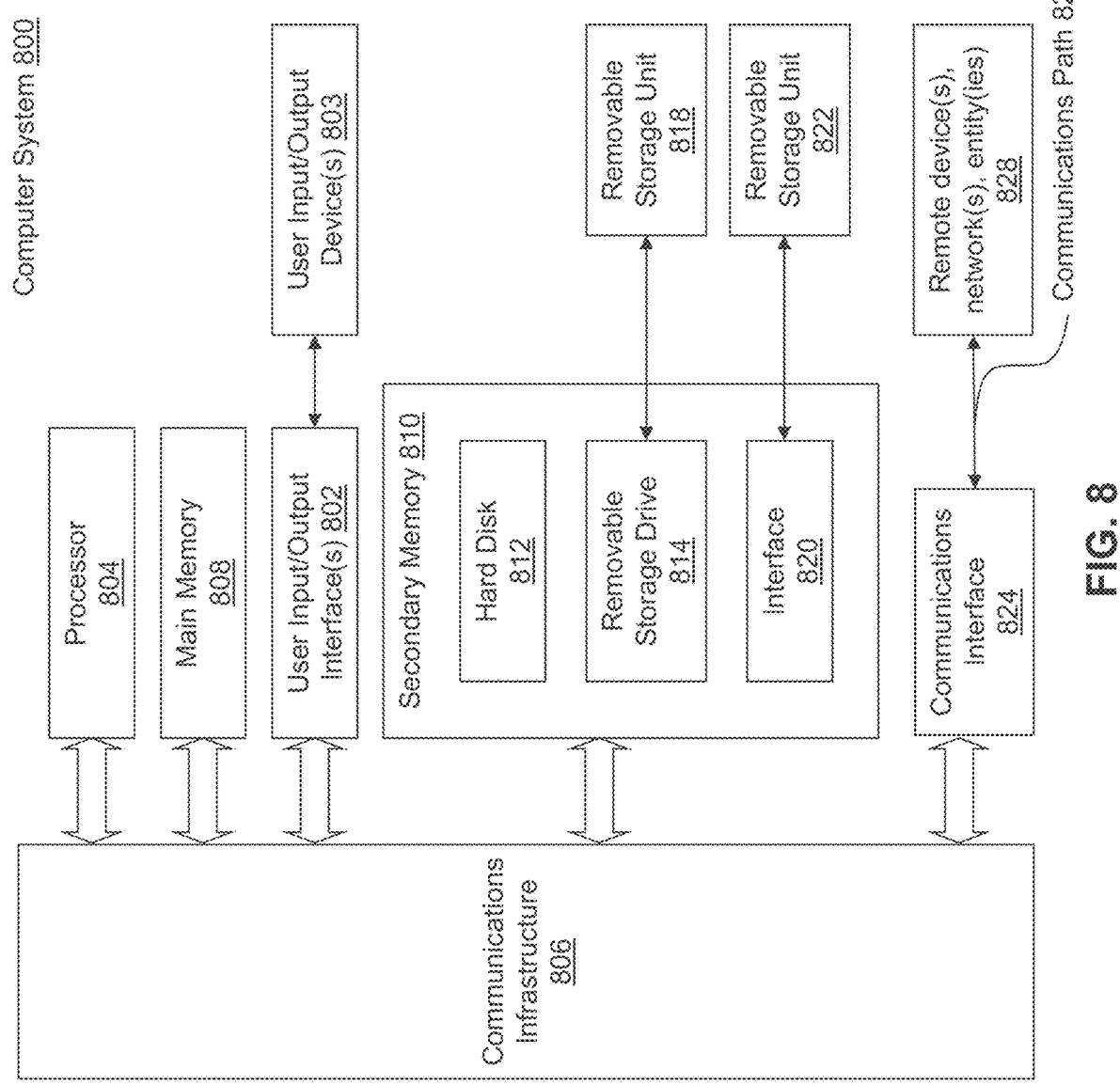
FIG. 8 illustrates an example computer system useful for implementing various embodiments.

Various embodiments may be implemented, for example, using one or more well-known computer systems, such as computer system 800 shown in FIG. 8. For example, the media device 106 may be implemented using combinations or sub-combinations of computer system 800. Also or alternatively, one or more computer systems 800 may be used, for example, to implement any of the embodiments discussed herein, as well as combinations and sub-combinations thereof.

Computer system 800 may include one or more processors (also called central processing units, or CPUs), such as one or more processors 804. In some embodiments, one or more processors 804 may be connected to a communications infrastructure 806 (e.g., a bus).

Computer system 800 may also include user input/output device(s) 803, such as monitors, keyboards, pointing devices, etc., which may communicate with communications infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main memory 808 (e.g., a primary memory or storage device), such as random access memory (RAM). Main memory 808 may include one or more levels of cache. Main memory 808 may have stored therein control logic (e.g., computer software) and/or data.

Computer system 800 may also include one or more secondary storage devices or memories such as secondary memory 810. Secondary memory 810 may include, for example, a hard disk drive 812, a removable storage drive 814 (e.g., a removable storage device), or both. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (e.g., control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 800 may further include a communications interface 824 (e.g., a network interface). Communications interface 824 may enable computer system 800 to communicate and interact with any combination of external devices, external networks, external entities, etc. (individually and collectively referenced by reference number 828). For example, communications interface 824 may allow computer system 800 to communicate with external devices 828 (e.g., remote devices) over communications path 826, which may be wired and/or wireless (or a combination thereof), and which may include any combination of LANs, WANs, the Internet, etc. Control logic and/or data may be transmitted to and from computer system 800 via communications path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture including a tangible, non-transitory computer useable or readable medium having control logic (software) stored thereon may also be referred to herein as a computer program product or program storage device. This includes, but is not limited to, computer system 800, main memory 808, secondary memory 810, removable storage unit 818, and removable storage unit 822, as well as tangible articles of manufacture embodying any combination of the foregoing. Such control logic, when executed by one or more data processing devices (such as computer system 800 or processor(s) 804), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all example embodiments as contemplated by the inventor(s), and thus, are not intended to limit this disclosure or the appended claims in any way.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

What is claimed is:

1. A computer-implemented method for synchronizing a presentation of multimedia content across multiple media devices, comprising:

generating, by a multimedia content synchronization application executing on a first media device, a multimedia content synchronization request configured to instruct a second media device to synchronize a presentation of multimedia content on the second media device with the first media device, wherein the multimedia content synchronization request is generated by the multimedia content synchronization application executed on the first media device independent from a multimedia content synchronization server and comprises a deep link indicative of a channel of the multimedia content to start the presentation of the multimedia content;

transmitting the multimedia content synchronization request to the second media device;

periodically synchronizing, b the multimedia content synchronization application executing on the first media device, the presentation of the multimedia content on the first media device and the second media device; and inserting, based on the periodical synchronization, by the multimedia content synchronization application executing on the first media device, filler content different from the multimedia content to account for a gap between the presentation of the multimedia content on the first media device and the presentation of the multimedia content on the second media device.

2. The computer-implemented method of claim 1, wherein:
  on the first media device, the multimedia content corresponds to a first channel having a first version of the multimedia content;
  on the second media device, the multimedia content corresponds to a second channel having a second version of the multimedia content; and
  the second version is different from the first version, and the gap between the presentation of the multimedia content on the first media device and the presentation of the multimedia content on the second media device is caused by a difference between the first version and the second version.

3. The computer-implemented method of claim 1, wherein the transmitting the multimedia content synchronization request to the second media device comprises:
  transmitting, by the multimedia content synchronization application executing on the first media device, the multimedia content synchronization request to the second media device.

4. The computer-implemented method of claim 1, wherein the transmitting the multimedia content synchronization request to the second media device comprises:
  transmitting, by the multimedia content synchronization application executing on the first media device, the multimedia content synchronization request to a multimedia content synchronization server; and
  transmitting, by the multimedia content synchronization server, the multimedia content synchronization request to the second media device.

5. The computer-implemented method of claim 1, wherein:
  the multimedia content synchronization request is a first multimedia content synchronization request; and
  the computer-implemented method further comprises:
    detecting, by the multimedia content synchronization application executing on the first media device, that the first media device has paused the presentation of the multimedia content, and
    generating, by the multimedia content synchronization application executing on the first media device, a second multimedia content synchronization request configured to instruct the second media device to pause the presentation of the multimedia content.

6. The computer-implemented method of claim 1, wherein the computer-implemented method further comprises:
  receiving, by the multimedia content synchronization application executing on the first media device, an electronic indication that the second media device has paused the presentation of the multimedia content; and
  pausing, by the multimedia content synchronization application executing on the first media device, the presentation of the multimedia content on the first media device.

7. The computer-implemented method of claim 1, wherein the computer-implemented method further comprises:

generating, by the multimedia content synchronization application executing on the first media device, an electronic message configured to instruct the second media device to display the electronic message in association with the presentation of the multimedia content on the second media device; and
transmitting the electronic message to the second media device.

8. A system, comprising:
a memory; and
at least one processor coupled to the memory and configured to perform operations comprising:
generating a multimedia content synchronization request configured to instruct a second media device to synchronize a presentation of multimedia content on the second media device with a first media device,
  wherein the multimedia content synchronization request is generated by a multimedia content synchronization application executed on the first media device independent from a multimedia content synchronization server and comprises a deep link indicative of a channel of the multimedia content to start the presentation of the multimedia content;
transmitting the multimedia content synchronization request to the second media device;
periodically synchronizing, by the multimedia content synchronization application executing on the first media device, the presentation of the multimedia content on the first media device and the second media device; and
inserting, based on the periodical synchronization, by the multimedia content synchronization application executing on the first media device filler content different from the multimedia content to account for a gap between the presentation of the multimedia content on the first media device and the presentation of the multimedia content on the second media device.

9. The system of claim 8, wherein:
on the first media device, the multimedia content corresponds to a first channel having a first version of the multimedia content;
on the second media device, the multimedia content corresponds to a second channel having a second version of the multimedia content; and
the second version is different from the first version, and the gap between the presentation of the multimedia content on the first media device and the presentation of the multimedia content on the second media device is caused by a difference between the first version and the second version.

10. The system of claim 8, wherein the transmitting the multimedia content synchronization request to the second media device comprises:
transmitting, by the multimedia content synchronization application executing on the first media device, the multimedia content synchronization request to the second media device.

11. The system of claim 8; wherein the transmitting the multimedia content synchronization request to the second media device comprises:
transmitting, by a multimedia content synchronization server, the multimedia content synchronization request to the second media device.

12. The system of claim 8, wherein:
the multimedia content synchronization request is a first multimedia content synchronization request; and
the operations further comprise:
   detecting that the first media device has paused the presentation of the multimedia content; and
   generating a second multimedia content synchronization request configured to instruct the second media device to pause the presentation of the multimedia content.

13. The system of claim 8, wherein the operations further comprise:
receiving an electronic indication that the second media device has paused the presentation of the multimedia content; and
pausing the presentation of the multimedia content on the first media device.

14. The system of claim 8, wherein the operations further comprise:
generating an electronic message configured to instruct the second media device to display the electronic message in association with the presentation of the multimedia content on the second media device; and
transmitting the electronic message to the second media device.

15. A non-transitory computer-readable medium having instructions stored thereon that, when executed by at least one computing device, cause the at least one computing device to perform operations comprising:
generating a multimedia content synchronization request configured to instruct a second media device to synchronize a presentation of multimedia content on the second media device with a first media device,
   wherein the multimedia content synchronization request is generated by a multimedia content synchronization application executed on the first media device independent from a multimedia content synchronization server and comprises a deep link indicative of a channel of the multimedia content to start the presentation of the multimedia content;
transmitting the multimedia content synchronization request to the second media device;
periodically synchronizing, by the multimedia content synchronization application executing on the first media device, the presentation of the multimedia content on the first media device and the second media device; and
inserting, based on the periodical synchronization, by the multimedia content synchronization application executing on the first media device, filler content different from the multimedia content to account for a gap between the presentation of the multimedia content on the first media device and the presentation of the multimedia content on the second media device.

16. The non-transitory computer-readable medium of claim 15; wherein:
on the first media device, the multimedia content corresponds to a first channel having a first version of the multimedia content;
on the second media device, the multimedia content corresponds to a second channel having a second version of the multimedia content; and
the second version is different from the first version, and the gap between the presentation of the multimedia content on the first media device and the presentation of the multimedia content on the second media device is caused by a difference between the first version and the second version.

17. The non-transitory computer-readable medium of claim 15, wherein the transmitting the multimedia content synchronization request to the second media device comprises:
transmitting, by the multimedia content synchronization application executing on the first media device, the multimedia content synchronization request to the second media device; or
transmitting, by a multimedia content synchronization server, the multimedia content synchronization request to the second media device.

18. The non-transitory computer-readable medium of claim 15, wherein:
the multimedia content synchronization request is a first multimedia content synchronization request; and
the operations further comprise:
   detecting that the first media device has paused the presentation of the multimedia content; and
   generating a second multimedia content synchronization request configured to instruct the second media device to pause the presentation of the multimedia content.

19. The non-transitory computer-readable medium of claim 15, wherein the operations further comprise:
receiving an electronic indication that the second media device has paused the presentation of the multimedia content; and
pausing the presentation of the multimedia content on the first media device.

20. The non-transitory computer-readable medium of claim 15, wherein the operations further comprise:
generating an electronic message configured to instruct the second media device to display, the electronic message in association with the presentation of the multimedia content on the second media device; and
transmitting the electronic message to the second media device.

\* \* \* \* \*

UNITED STATES PATENT AND TRADEMARK OFFICE
CERTIFICATE OF CORRECTION

PATENT NO. : 11,757,992 B2  
APPLICATION NO. : 17/520431  
DATED : September 12, 2023  
INVENTOR(S) : Huertas et al.

Page 1 of 1

It is certified that error appears in the above-identified patent and that said Letters Patent is hereby corrected as shown below:

In the Claims

In Column 26, Claim 1, Line 64, delete "b the" and insert -- by the --, therefor.

In Column 28, Claim 8, Line 35, delete "device" and insert -- device, --, therefor.

In Column 28, Claim 11, Line 62, delete "claim 8;" and insert -- claim 8, --, therefor.

In Column 30, Claim 16, Line 2, delete "claim 15;" and insert -- claim 15, --, therefor.

Signed and Sealed this  
Thirtieth Day of December, 2025

John A. Squires  
*Director of the United States Patent and Trademark Office*